US008634463B2

United States Patent
Shi et al.

(10) Patent No.: US 8,634,463 B2
(45) Date of Patent: Jan. 21, 2014

(54) APPARATUS AND METHOD OF ENHANCED FRAME INTERPOLATION IN VIDEO COMPRESSION

(75) Inventors: Fang Shi, San Diego, CA (US); Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1437 days.

(21) Appl. No.: 11/558,867

(22) Filed: Nov. 10, 2006

(65) Prior Publication Data

US 2007/0230578 A1    Oct. 4, 2007

Related U.S. Application Data

(60) Provisional application No. 60/789,319, filed on Apr. 4, 2006.

(51) Int. Cl.
*H04N 7/12* (2006.01)

(52) U.S. Cl.
USPC .................................................. 375/240.11

(58) Field of Classification Search
USPC .................................................. 375/240.11
See application file for complete search history.

(56) References Cited

U.S. PATENT DOCUMENTS

| | | | |
|---|---|---|---|
| 3,670,096 A | 6/1972 | Candy et al. | |
| 5,168,394 A | 12/1992 | Sasho | |
| 5,198,902 A | 3/1993 | Richards et al. | |
| 5,387,947 A | 2/1995 | Shin | |
| 5,394,196 A | 2/1995 | Robert | |
| 5,784,107 A | 7/1998 | Takahashi | |
| 5,844,616 A | 12/1998 | Collet et al. | |
| 5,995,154 A | 11/1999 | Heimburger | |
| 6,008,865 A | 12/1999 | Fogel | |
| 6,043,846 A * | 3/2000 | Shen et al. | 348/409.1 |
| 6,101,220 A | 8/2000 | Ando | |
| 6,192,079 B1 | 2/2001 | Sharma et al. | |
| 6,208,760 B1 | 3/2001 | De Haan et al. | |
| 6,229,570 B1 | 5/2001 | Bugwadia et al. | |
| 6,229,925 B1 | 5/2001 | Alexandre et al. | |

(Continued)

FOREIGN PATENT DOCUMENTS

| | | |
|---|---|---|
| CL | 01532007 | 11/2007 |
| CL | 07862007 | 11/2007 |

(Continued)

OTHER PUBLICATIONS

"Advanced Video Coding for Generic Audiovisual Services," ITU-T Standard Pre-Published (P), International Telecommunication Union, Geneva, N. H264 3/5, Mar. 1, 2005, XP002448756.

(Continued)

*Primary Examiner* — Jay Patel
*Assistant Examiner* — Richard Torrente
(74) *Attorney, Agent, or Firm* — Dang M. Vo; Brent Boyd (57) ABSTRACT

Aspects include systems and methods of improving processing in an encoder in a multimedia transmission system. Other aspects include method and systems of processing in a decoder in a multimedia transmission system. For example, one aspect includes a method and apparatus of reduced encoding size in an encoder by encoding in terms of an interpolated frame. Other aspects include decoders configured to decode video signals encoded with reference to an interpolated frame.

43 Claims, 7 Drawing Sheets

(56) References Cited

U.S. PATENT DOCUMENTS

| | | | |
|---|---|---|---|
| 6,330,535 | B1 | 12/2001 | Yasunaga et al. |
| 6,345,247 | B1 | 2/2002 | Yasunaga et al. |
| 6,404,901 | B1 | 6/2002 | Itokawa |
| 6,424,676 | B1 | 7/2002 | Kono et al. |
| 6,480,541 | B1 | 11/2002 | Girod et al. |
| 6,560,371 | B1 | 5/2003 | Song et al. |
| 6,597,738 | B1 | 7/2003 | Park et al. |
| 6,618,439 | B1 | 9/2003 | Kuo et al. |
| 6,625,333 | B1 | 9/2003 | Wang et al. |
| 6,654,420 | B1 | 11/2003 | Snook |
| 6,704,357 | B1 | 3/2004 | Ketcham |
| 6,728,317 | B1 | 4/2004 | Demos |
| 7,003,038 | B2 | 2/2006 | Divakaran et al. |
| 7,042,941 | B1 | 5/2006 | Laksono et al. |
| 7,075,986 | B2 | 7/2006 | Girod et al. |
| 7,116,716 | B2 | 10/2006 | Ma et al. |
| 7,215,710 | B2 | 5/2007 | Yamada et al. |
| 7,280,708 | B2 | 10/2007 | Song et al. |
| 7,343,044 | B2 | 3/2008 | Baba et al. |
| 7,457,471 | B2 | 11/2008 | Song et al. |
| 7,577,196 | B2 | 8/2009 | Ducloux et al. |
| 2004/0017852 | A1 | 1/2004 | Garrido et al. |
| 2005/0005301 | A1 | 1/2005 | Song et al. |
| 2005/0265451 | A1 | 12/2005 | Shi et al. |
| 2006/0002465 | A1* | 1/2006 | Raveendran et al. .... 375/240.01 |
| 2006/0018383 | A1 | 1/2006 | Shi et al. |
| 2006/0039476 | A1 | 2/2006 | Watanabe |
| 2006/0159359 | A1 | 7/2006 | Lee |
| 2006/0165176 | A1 | 7/2006 | Raveendran et al. |
| 2007/0064800 | A1* | 3/2007 | Ha .......................... 375/240.12 |
| 2007/0230563 | A1 | 10/2007 | Tian et al. |
| 2007/0230564 | A1 | 10/2007 | Chen et al. |
| 2008/0002862 | A1 | 1/2008 | Matsugu et al. |
| 2008/0112606 | A1 | 5/2008 | Lee et al. |
| 2013/0188742 | A1 | 7/2013 | Raveendran et al. |

FOREIGN PATENT DOCUMENTS

| | | |
|---|---|---|
| EP | 0018856 | 11/1980 |
| EP | 07822343 | 7/1997 |
| EP | 0881836 A1 | 12/1998 |
| EP | 0883298 A2 | 12/1998 |
| EP | 1287492 | 3/2003 |
| EP | 1357750 | 10/2003 |
| EP | 1369820 | 12/2003 |
| EP | 1383322 | 1/2004 |
| EP | 1481546 | 12/2004 |
| EP | 1617678 A2 | 1/2006 |
| GB | 2316568 A | 2/1998 |
| JP | 08191448 | 7/1996 |
| JP | 08223536 | 8/1996 |
| JP | 8256340 A | 10/1996 |
| JP | 10066033 A | 3/1998 |
| JP | 11112940 A | 4/1999 |
| JP | 11177940 A | 7/1999 |
| JP | H11510937 A | 9/1999 |
| JP | 2000134585 A | 5/2000 |
| JP | 2000512091 | 9/2000 |
| JP | 2003515987 T | 5/2003 |
| JP | 2003274415 A | 9/2003 |
| JP | 2003348596 A | 12/2003 |
| JP | 2004112229 | 4/2004 |
| JP | 2004166183 A | 6/2004 |
| JP | 2005526457 A | 9/2005 |
| JP | 2008526119 A | 7/2008 |
| JP | 2009510937 | 3/2009 |
| JP | 2009532990 A | 9/2009 |
| JP | 2010136383 A | 6/2010 |
| KR | 1019990082104 | 11/1999 |
| KR | 20030073254 A | 9/2003 |
| RU | 2182727 | 5/2002 |
| RU | 2201654 | 3/2003 |
| TW | 480885 B | 3/2002 |
| WO | WO9216071 | 9/1992 |
| WO | 9728507 | 8/1997 |
| WO | 9746020 A2 | 12/1997 |
| WO | 9746022 A2 | 12/1997 |
| WO | 9922525 A1 | 5/1999 |
| WO | WO0133864 | 5/2001 |
| WO | WO2004025965 | 3/2004 |
| WO | 2006007527 A2 | 1/2006 |

OTHER PUBLICATIONS

A.M. Tekalp, "Digital Video Processing", Oppenheim, ed, Prentice Hall Signal Processing Series, Upper Saddle River, NJ 1995.

Bruijn Def.J., et al "Efficient video coding integrating MPEG-2 and picture-rate conversion," IEEE Transactions on Consumer Electronics, IEEE Service Center, 2002, 48 (3), 688-693.

Castagno et al., "A Method for Motion Adaptive Frame Rate Up-Conversion," IEEE Transactions on Circuits and Systems for Video Technology, IEEE Service Center, Piscataway, NJ, USA, vol. 6, No. 5,Oct. 1996, pp. 436-445, XP000627032.

Chen, Tao, "Adaptive Temporal lnerpolation Using Bidirectional Motion Estimation and Compensation," Institute of Electrical and Electronics Engineers: Proceedings 21002 International Conference on Image Processing, ICIP, Rochester, NY, Sep. 22-25, 2002, IEEE, US, vol. 2 or 3, pp. 313-316, XP010607971.

Dane G., et al., "Encoder-Assisted Adaptive Video Frame Interpolation," Acoustics, Speech, and Signal Processing, 2005. Proceedings. (ICASSP '05). IEEE International Conference on, Philadelphia, PA, Piscataway, NJ, IEEE, vol. 2, Mar. 18, 2005, pp. 349-352.

Flierl et al., "Generalized B Pictures and the DRaft H.264/AVC Video-Compresiion Standard", IEEE Trans. Circuit and Systems for Video Technology, vol. 13, No. 7, pp. 587-597, 2003.

Inazumi, et al., "Estimation of the Optimal Frame Rate for Video Communications Under Bit-Rate Constraints, Scripta Technica, New York, USA, Part I, XP001171954," Electronics & Communications in Japan Part I—Communications, 2003, 86 (12), 54-67.

Kim et al.,: A new video interpolation technique based on motion-adaptive subsampling This work was supported by Jeoju University, Korea. IEEE Transactions on Consumer Electronics, IEEE Service Center, New York, U.S. LNKD-DOI:10.1109/30.793602, vol. 45, No. 3, Aug. 1, 1999, pp. 782-787, XP011083800.

Liu et al., "Adaptive Video Multcast over the Internet", IEEE Computer Society, 2003, pp. 22-33.

Pyun et al., "Scene-Adaptive Frame-Layer Rate Control for Low Bit Rate Video,Tokyo, Japan, XP001184530," IEICE Transactions on Fundamentals of Electronics, Communications and Computer Sciences, Institute of Electronics Information and Comm. Eng.,, 2003, E86-A (10), 2618-2622.

Sasai et al., "Frame-Rate Up-Conversion Using Reliable Analysis of Transmitted Motion Information, uebec, Canada, May 17-21, 2004, Piscataway, NJ, USA, IEEE XP010718914," Acoustics, Speech, and Signal Processing, 2004, IEEE International Conference on Montreal, 2004, 5, 257-260.

Taiwanese Search report—096112147—TIPO—Jun. 7, 2010.

"Rate-Constrained Coder Control and Comparison of Video Coding Standards," IEEE Transactions on Circuits and Systems FO Video Technology, vol. 13, No. 7, pp. 688-703, (Jul. 2003).

Fukunaga et al.:, "MPEG-4-Video Verification Model Version 16.0", International Organization for Standardization, vol. N3312, Mar. 2000, pp. I-38, XP000861688 Section 3.7, pp. 81-88.

Gallant et al.: "Efficient scalable DCT-based video coding at low bit rates", Image Processing, 1999. IC 99. International Conference on Kobe, Japan Oct. 24-28, 1999, Piscataway, NJ, USA, IEEE, US, vol. 3, Oct. 24, 1999, pp. 782-786, XP010368741.

Ghan Di M. et al., Layered H.264 Video Transmission with Hierarchical QAM [Online] May 1, 2005, pp. 1-17, xp002446009.

Liu et al.: "MCI-Embedded Motion-Compensated Prediction for Quality Enhancement of Frame Interpolation", Proceedings of the SPIE—The International Society for Optical Engineering, Multimedia Systems and Applications III, vol. 4209, Nov. 6, 2000, pp. 251-261,XP002351712, Boston, MA, USA, 2001, abstract, Section 1, pp. 251-252, Section 2, pp. 253-254, Section 4, pp. 256-257.

Puri et al.: "An Interframe Coding Scheme for Packet Video", Proceedings of the SPIE, Belingham,VA, US, vol. 1199, No. Part 3, Nov.

(56) References Cited

OTHER PUBLICATIONS 8, 1989, pp. 1610-1619, XP000568683, abstract section 3, p. 1611 Section 5, pp. 1612-1613 with figures 2 and 4.

Puri et al.: "Video Coding with Motion-Compensated Interpolation for CD-ROM Applications", Signal Processing Image Communication, Elsevier Science Publishers, Amsterdam, NL vol. 2, No. 2, Aug. 1, 1990, pp. 127-144, XP000243473 abstract section 4, pp. 130-132.

Sasai et al.: "B-Picture Coding with Motion-Compensated Frame Rate up Conversion", Proceedings of the SPIE—The International Society for Optical Engineering, Image and Video Communications and Processing 2005, vol. 5685, Jan. 18, 2005, p. 792-800, XP002351713 San Jose, CA, USA, 2005 abstract Sections 3.1 and 3.3.

Schwarz H et al., "MCTF and Scalability Extension of H. 264/AVC," Internet Citation, [Online] Dec. 15, 2004, XP002368924.

Schwarz H. et al., "Combined Scalability Support for the Scalable Extension of H.264/AVC," Multimedia and Expo, 2005. ICME 2005. IEEE International Conference on Ansterdam, The Netherlands, Jul. 6, 2006, pp. 446-449,XP010843292.

Sulivan at al.: "Rate-Distortion Optimization for Video Compression", IEEE Signal Processing Magazine, IEEE Service Center, Piscataway, NJ, US, vol. 15, No. 6, Nov. 1998, pp. 74-90, XP001064929, Sub-section "Distortion Measures", pp. 78-79 Sub-section."OptimizationTechniques", ", pp. 80-81 Sub-sub-section" Variable Block Sizes, p. 82: paragraph entitled "Case 1", p. 82 Sub-section "Infra/Inter/Skip Mode Decision", pp. 84-85 Sub-section "Comparison to Other Encoding Strategies", p. 87-88.

Thomas Wiegand: "Joint Model No. 1, Revision 1 (JM-IRL)", ITU Study Group 16-Video Coding Experts Group, Dec. 3, 200 (Dec. 3, 2001), pp. 1, 3-75, XP001086627 Section 5, pp. 40-44 Appendix I, pp. 50-57.

TIA-1099 "Forward Link Only Air Interface Specification for Terrestrial Mobile Multimedia Multicast" Aug. 2006.

Written Opinion—PCT/US2007/065998, International Search Authority—European Patent Office—Sep. 7, 2007.

International Preliminary Report—PCT/US2007/065998, International Search Authority—The International Bureau of WIPO—Geneva, Switzerland—Oct. 8, 2008.

A. Kaup et al.: "Efficient prediction of uncovered background in inter-frame coding using spatial extrapolation" in Proc. ICASSP, vol. 5, pp. 501-504, 1994.

G. Dane and T.Q. Nguyen, "Motion vector processing for frame rate up conversion" in IEEE international Conference on Acoustics, Speech, and Signal Processing, pp. 309-312, May 2004.

R. Thoma et al.: "Motion compensating interpolation considering covered and uncovered background", Signal Processing: Image Compression 1, pp. 191-212, 1989.

T. Kuo et al.: "Motion-compensated interpolation for low-bit-rage video quality enhancement" in Proc. SPIE Applications of Digital Image Processing, vol. 3460, p. 277-288, 1998.

Telecommunication Standardization Sector of ITU: "Recommendation H.264 Advanced Video Coding for Generic Audovisual Services" ITU-T Recommendations, International Telecommunication Union, Geneva, CH, No. H264, Mar. 2005.

PCT Search Report, Sep. 7, 2007

Lee S-H et al: "Weighted-adaptive motion-compensated frame rate up-conversion", IEEE Transactions on Consumer Electronics, IEEE Service Center, New York, NY, US, vol. 49, No. 3, Aug. 1, 2003, pp. 485-492, XP002290775, ISSN: 0098-3063, DOI: 10.1109/TCE. 2003.1233759.

Sung-Hee Lee et al: "Adaptive motion-compensated interpolation for frame rate up-conversion" IEEE Transactions on Consumer Electronics, vol. 48, No. 3, Aug. 2002, pp. 444-450.

Yoshiritsu Hatori, et al.,. (written by), Digital Image Network, 1st edition, The Institute of Image Information and Television Engineers (edited by), Kabushiki Kaisha Koronasha, Dec. 25, 2002, pp. 22 to 23, ISBN: 4-339-01262-9.

Hur J.H., et al.,"H. 264 to MPEG-4 Transcoding Using Block Type Information," Proceedings of the 2005 IEEE Region 10 Conference (TENCON 2005), 2005, pp. 1-6, ISBN: 0-7803-9311-2.

Kikuchi Y., et. al., "Improved multiple frame motion compensation using frame interpolation", Joint Video Team(JVT) of ISO/IEC MPEG & ITU-TVCEG (ISO/IEC JTC1/SC29/WG11 and ITU-T SG16 Q.6), Document: JVT-B075, Jan. 29-Feb. 1, 2002, [online] Jan. 17, 2005, <URL:http://wftp3.itu.int/av-arch/jvt-site/2002_01_Geneva/JVT-B075.doc>.

Ono S., et al., "Ubiquitous Technology: High Efficiency Encoding of Dynamic Images—MPEG-4 and H.264," Japan, Ohmsha Ltd., Apr. 20, 2005, 1st ed., Nos. 61-63 and 67, pp. 129, ISBN: 4-274-20060-4.

Sekiguchi S., et al., "Study of Dynamic Network-Adaptive Transcoder," Proceedings of the 66th (2004) National Conference of the Information Processing Society of Japan, The Information Processing Society of Japan, Mar. 9, 2004, vol. 5, pp. 201-204.

Wiegand T., "H.26L Test Model Long-Term Number 9 (TML-9) draft0", ITU—Telecommunications Standardization Sector Study Group 16 Video Coding Experts Group (VCEG), Document VCEG-N83 d1, 2001.

\* cited by examiner

APPARATUS AND METHOD OF ENHANCED FRAME INTERPOLATION IN VIDEO COMPRESSION

CROSS REFERENCE TO RELATED APPLICATIONS

Claim of Priority Under 35 U.S.C. §119

The present application for patent claims priority to U.S. Provisional Patent Application No. 60/789,319, entitled "Encoder Assisted Frame Rate Up Conversion," filed Apr. 4, 2006, assigned to the assignee hereof and hereby expressly incorporated by reference herein.

Reference to Co-Pending Applications for Patent

The present application for patent is related to U.S. patent application Ser. No. 11/558,833, entitled "Adaptive Encoder-Assisted Frame Rate Up Conversion," filed on the same date of this application, and assigned to the assignee hereof, and expressly incorporated by reference herein. The present application for patent is also related to U.S. patent application Ser. No. 11/173,121, entitled "Method and Apparatus for Using Frame Rate Up Conversion Techniques in Scalable Video Coding," filed Jul. 1, 2005, assigned to the assignee hereof, and expressly incorporated by reference herein. The present application for patent is also related to U.S. patent application Ser. No. 11/122,678, entitled "Method And Apparatus For Motion Compensated Frame Rate Up Conversion For Block-Based Low Bit Rate Video," filed May 4, 2005, assigned to the assignee hereof, and expressly incorporated by reference herein.

BACKGROUND

1. Field

The invention relates to multimedia signal processing and, more particularly, to video encoding and decoding.

2. Background

Multimedia processing systems, such as video encoders, may encode multimedia data using encoding methods based on international standards such as MPEG-x and H.26x standards. Such encoding methods generally are directed to compressing the multimedia data for transmission and/or storage. Compression is broadly the process of removing redundancy from the data.

A video signal may be described in terms of a sequence of pictures, which include frames (an entire picture), or fields (e.g., an interlaced video stream comprises fields of alternating odd or even lines of a picture). As used herein, the term "frame" is broadly used to refer to a picture, a frame, or a field. Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. As used herein, the term "block" refers to either a macroblock or a subblock.

Video encoding methods compress video signals by using lossless or lossy compression algorithms to compress each frame or blocks of the frame. Intra-frame coding refers to encoding a frame using data from that frame. Inter-frame coding refers to predictive encoding schemes such as schemes that comprise encoding a frame based on other, "reference," frames. For example, video signals often exhibit temporal redundancy in which frames near each other in the temporal sequence of frames have at least portions that match or at least partially match each other. Encoders can take advantage of this temporal redundancy to reduce the size of encoded data.

Encoders may take advantage of this temporal redundancy by encoding a frame in terms of the difference between the frame and one or more reference frames. For example, video encoders may use motion compensation based algorithms that match blocks of the frame being encoded to portions of one or more other frames. The block of the encoded frame may be shifted in the frame relative to the matching portion of the reference frame. This shift is characterized by a motion vector. Any differences between the block and partially matching portion of the reference frame may be characterized in terms of a residual. The encoder may thus encode a frame as data that comprises one or more of the motion vectors and residuals for a particular partitioning of the frame. A particular partition of blocks for encoding the frame may be selected by approximately minimizing a cost function that, for example, balances encoding size with distortion to the content of the frame resulting from an encoding.

Reference frames may include one or more prior frames of the video signal or one or more frames that follow the frame in the video signal in terms of output order. The H.264 standard, for example, includes a configuration that uses five reference frames in searching for the best matching block. In general, searching of more reference frames increases the ability of the encoder to find portions of one of the reference frames that closely matches the block of the frame being encoded. Better matches have a smaller difference to encode, which generally results in a more compact encoding. However, encoding such matches may still require a significant amount of bandwidth. Thus, a need exists for better ways of encoding video data.

SUMMARY

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description" one will understand how the features of this invention provide advantages that include reduced bandwidth requirements for video signals.

One aspect comprises a method of processing multimedia data. The method comprises generating at least one interpolated frame. The method further comprises identifying a plurality of reference frames comprising said interpolated frame. The method further comprises encoding at least a portion of a frame based at least on the plurality of reference frames.

Another aspect comprises an apparatus for processing multimedia data. The apparatus comprises a generator configured to generate at least one interpolated frame. The apparatus further comprises an identifier configured to identify a plurality of reference frames comprising said interpolated frame. The apparatus further comprises an encoder configured to encode at least a portion of a frame based at least on the plurality of reference frames.

Another aspect comprises an apparatus for processing multimedia data. The apparatus comprises means for generating at least one interpolated frame. The apparatus further comprises means for identifying a plurality of reference frames comprising said interpolated frame. The apparatus further comprises means for encoding at least a portion of a frame based at least on the plurality of reference frames.

Another aspect comprises a multimedia data processor comprising a configuration to generate at least one interpolated frame, identify a plurality of reference frames comprising said interpolated frame, and encode at least a portion of a frame based at least on the plurality of reference frames.

Another aspect comprises machine readable medium comprising instructions for processing multimedia data. The instructions upon execution cause a machine to generate at least one interpolated frame, identify a plurality of reference frames comprising said interpolated frame, and encode at least a portion of a frame based at least on the plurality of reference frames.

One aspect comprises a method of processing multimedia data. The method comprises receiving encoded data indicative of an interpolated reference frame for at least a portion of a frame. The method further comprises generating at least a portion of said interpolated reference frame. The method further comprises decoding at least a portion of the frame based at least in part on the generated portion of the interpolated reference frame.

Another aspect comprises an apparatus for processing multimedia data. The apparatus comprises a receiver configured to receive encoded data indicative of an interpolated reference frame for at least a portion of a frame. The apparatus further comprises a generator configured to generate at least a portion of said interpolated reference frame. The apparatus further comprises a decoder configured to decode at least a portion of the frame based at least in part on the generated portion of the interpolated reference frame.

Another aspect comprises an apparatus for processing multimedia data. The apparatus comprises means for receiving encoded data indicative of an interpolated reference frame for at least a portion of a frame. The apparatus further comprises means for generating at least a portion of said interpolated reference frame. The apparatus further comprises means for decoding at least a portion of the frame based at least in part on the generated portion of the interpolated reference frame.

Another aspect comprises a multimedia data processor comprising a configuration to receive encoded data indicative of an interpolated reference frame for at least a portion of a frame, generate at least a portion of said interpolated reference frame, and encode at least a portion of the frame based at least in part on the generated portion of the interpolated reference frame.

Another aspect comprises machine readable medium comprising instructions for processing multimedia data. The instructions upon execution cause a machine to receive encoded data indicative of an interpolated reference frame for at least a portion of a frame, generate at least a portion of said interpolated reference frame, and decode at least a portion of the frame based at least in part on the generated portion of the interpolated reference frame.

DETAILED DESCRIPTION

The following detailed description is directed to certain specific aspects of the invention. However, the invention can be embodied in a multitude of different ways as defined and covered by the claims. In this description, reference is made to the drawings wherein like parts are designated with like numerals throughout. In the following description, specific details are given to provide a thorough understanding of the aspects described. However, it will be understood by one of ordinary skill in the art that the aspects may be practiced without these specific details. For example, electrical components may be shown in block diagrams in order not to obscure the aspects in unnecessary detail. In other instances, such components, other structures and techniques may be shown in detail to further explain the aspects.

Moreover, it is to be recognized that depending on the aspect, certain acts or events of any of the methods, processes, block diagrams, and flowcharts described herein can be performed in a different sequence, may be added, merged, or left out all together (e.g., not all described acts or events are necessary for the practice of the method). Moreover, in certain aspects, acts or events may be performed concurrently, e.g., through multi-threaded processing, interrupt processing, or multiple processors, rather than sequentially. It is further to be recognized that the methods, processes, block diagrams, and flowcharts described herein may be repeated, either in whole or in part.

Aspects include systems and methods of improving processing in an encoder in a multimedia transmission system. Other aspects include method and systems of processing in a decoder in a multimedia transmission system. Multimedia data may include one or more of motion video, audio, still images, or any other suitable type of audio-visual data. For example, one aspect comprises a method of reduced encoding size in an encoder by encoding in terms of an interpolated frame. An interpolated frame is a frame that a decoder (or encoder) generates by interpolating data from nearby frames. One type of interpolated frame is a frame rate upconversion frame that is generated to increase the output frame rate of a video decoder. Such frames are typically not communicated between the encoder and decoder, but are generated at the decoder based on temporally proximal frames. It has been found that an encoder may achieve certain efficiencies by encoding a frame with reference to such an interpolated frame. In particular, the encoder may reduce the amount of motion compensation data in the encoded data for the frame that the decoder generates that motion compensation data in interpolating the frame, e.g., by reducing the amount of encoded residual data.

Another aspect comprises using a standard multimedia encoding format to communicate the reference to the interpolated frame from the encoder to the decoder. Depending on the encoding format, using the standard encoding data format to encode the reference to the interpolated frame can further reduce the size of the encoded frame data output by the encoder, e.g., by communicating the reference to the interpolated frame by using bits.

Figure 1:
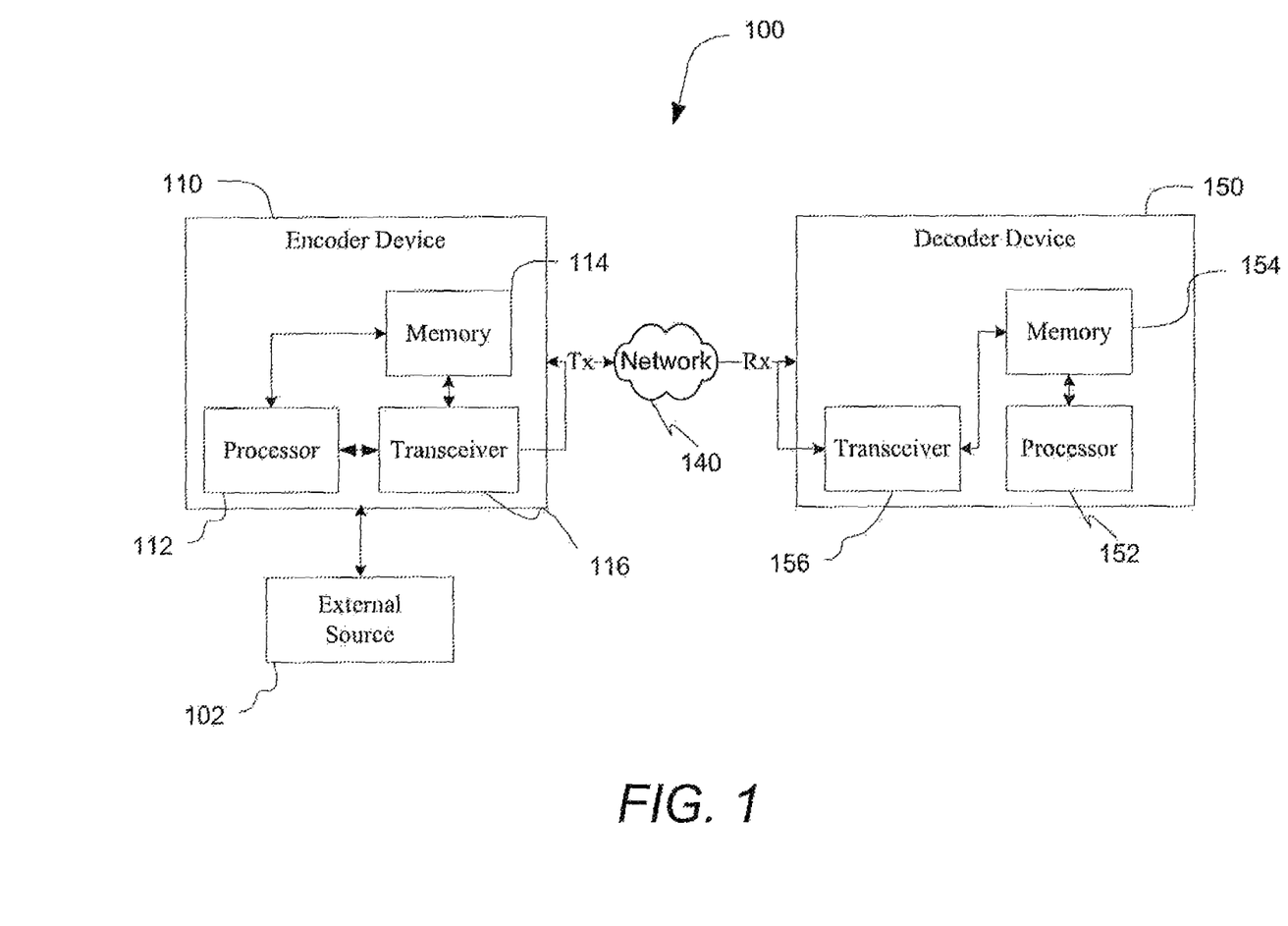
FIG. 1 is a block diagram illustrating a multimedia communications system according to one aspect.

FIG. 1 is a block diagram illustrating a multimedia communications system 100 according to one aspect. The system 100 includes an encoder device 110 in communication with a decoder device 150 via a network 140. In one example, the encoder device receives a multimedia signal from an external source 102 and encodes that signal for transmission on the network 140.

In this example, the encoder device 110 comprises a processor 112 coupled to a memory 114 and a transceiver 116. The processor 112 encodes data from the multimedia data source and provides it to the transceiver 116 for communication over the network 140.

In this example, the decoder device 150 comprises a processor 152 coupled to a memory 154 and a transceiver 156. The processor 152 may include one or more of a general purpose processor or a digital signal processor. The memory 154 may include one or more of solid state or disk based storage. The transceiver 156 is configured to receive multimedia data over the network 140 and provide it to the processor 152 for decoding. In one example, the transceiver 156 includes a wireless transceiver. The network 140 may comprise one or more of a wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple access (OFDMA) system a time division multiple access (TDMA) system such as GSM/GPRS (General Packet Radio Service)/EDGE (enhanced data GSM environment), a TETRA (Terrestrial Trunked Radio) mobile telephone system, a wideband code division multiple access (WCDMA) system, a high data rate (1xEV-DO or 1xEV-DO Gold Multicast) system, an IEEE 802.11 system, a MediaFLO system, a DMB system, or a DVB-H system.

Figure 2:
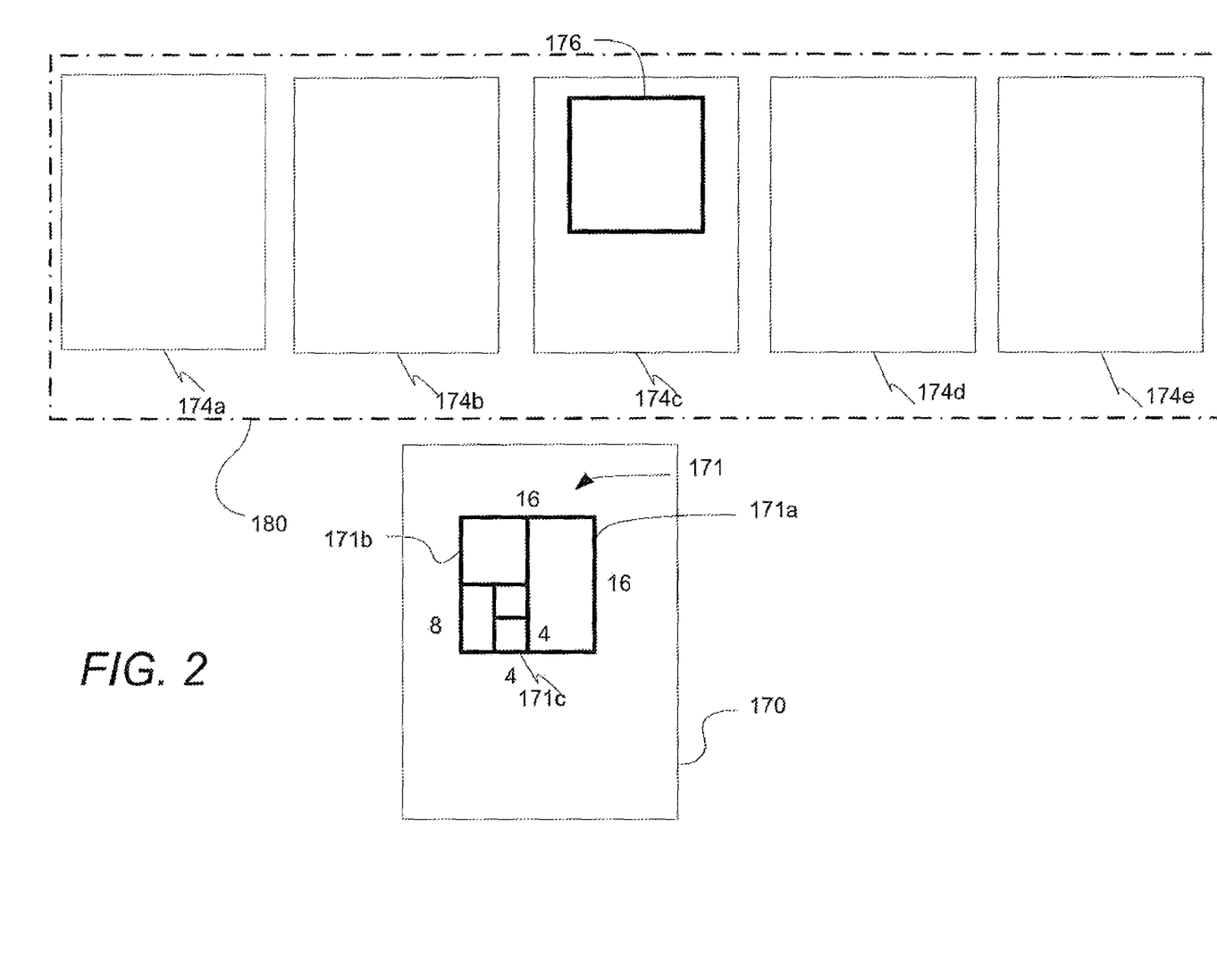
FIG. 2 graphically illustrates portions of a method of encoding a portion of a video frame in a system such as illustrated in FIG. 1.

FIG. 2 graphically illustrates an aspect of a method of encoding a portion of a video frame in a system such as illustrated in FIG. 1. Frames may include intra (I) frames that are encoded without reference to other frames, predictive (P) frames encoded with reference to temporally prior frames, and bi-predictive (B) frames that are encoded with respect to temporally prior and/or future frames.

As illustrated in FIG. 2, a frame 170 may be divided into a number of macroblocks 171a. Each macroblock 171a comprises an array of pixels, e.g., a 16×16 array of pixels of the frame 170. Further, the encoder 110 may partition the macroblocks 171 into any number of smaller blocks such as the 8×8 subblock 171b, or the 4×4 subblock 171c. Optionally, the encoder 110 may vary the subblock sizes within the frame 170 and/or between encoded frames 170. Collectively, the macroblocks 171a and the partitions of macroblocks such as subblocks 171b are referred to herein as "blocks" and referred to collectively with reference to item 171 of FIG. 2.

Encoded video frames 170 (or blocks 171 of the frames 170) may be encoded without dependency on other frames (e.g., intramode) or predictively based on other encoded frames (e.g., intermode). The particular mode of encoding used for a portion of the frame 170 may be referred to as a "mode" (of encoding). The encoder 110 may encode different portions of the frame 170, e.g., different blocks 171 or subblocks 171, using different modes. For example, motion estimation algorithms may be used to encode the frame 170 or one or more blocks 171 of the frame 170. One example of the encoder 110 encodes the frame 170 in terms of blocks that include blocks of sizes such as 16×16, 16×8, 8×16, 8×8, 8×4, 4×8, 4×4 (but other sizes may be used). The encoded frame 170 may comprise a partition of the frame 170 into a set of encoded blocks 171 that encodes substantially all the pixels of the frame 170. The encoded blocks 171 may be of different sizes and selected based on a cost function that allows comparison of different encoding strategies based on a weighted average of factors such as encoded data size and resulting distortion of the image.

As noted above, one way of predicting video frames is using motion estimation algorithms that take advantage of temporal redundancy in video data to encode the frame 170 based on at least partially matching blocks 171 from one frame to another frame, e.g., a reference frame. Motion estimation algorithms identify blocks 176 in one or more reference frames 174 that are similar to (e.g., at least partially match) the blocks 171 of the frame 170 but possibly shifted in location in the encoded frame 174. Note that in various aspects, motion estimation algorithms may use reference frames 174 that were previous to the current frame 170 in time, subsequent to the frame 170, or both. The blocks 171 of the frame 170 are encoded in terms of a motion vector indicative of positional differences between the block 171 and the block 176 and residual data indicative of the differences between the pixel values of the block 171 of the frame 170 relative to a reference block (e.g., block 176 of a reference frame 174c) found in a list of one or more references frames 174 (e.g., references frames 174a, 174b, 174c, 174d, and 174e). The reference frames 174 may be a temporally ordered list 180 of frames that precede or follow the frame 170 in the video signal. As shown in FIG. 2, the encoder 110 may compare the block 171b of the frame 170 to the reference frames 174 to identify corresponding blocks such as the block 176 in the frame 174c.

The encoder 110 may calculate motion compensation data, e.g., motion vectors and residuals, for each of a group of blocks such as 16×16, 16×8, 8×16, 8×8, 8×4, 4×8, and 4×4 blocks (partitions) of the blocks 171. The encoder 110 may first calculate the motion compensation data for larger blocks 171, e.g., 16×16, then for calculate the motion compensation data for each subblock of the larger blocks, e.g., 16×8, 8×8, etc. The encoder 110 can select a particular partition or set of the blocks 171 of one or more sizes that covers substantially all of the frame 170. The encoder 110 may select particular blocks and respective predictive data for each portion of the frame 170 based on a cost function, e.g., a rate-distortion (RD) function, that comprises a measure of that trades off between encoding size and distortion based on the encoding data size of a frame or portion of the frame using a particular set of motion vectors and residuals for a particular set of the blocks of the frame and corresponding estimates of the resulting image distortion. Encoders 110 may use any suitable cost function, including those known in the art. For example, suitable cost functions are disclosed in "Rate-Constrained Coder Control and Comparison of Video Coding Standards," IEEE TRANSACTIONS ON CIRCUITS AND SYSTEMS FOR VIDEO TECHNOLOGY, VOL. 13, NO. 7, 688 (July 2003). The cost functions may comprise, for example, rate-distortion functions, smallest residue, and/or sum of absolute difference (SAD) functions.

Figure 3:
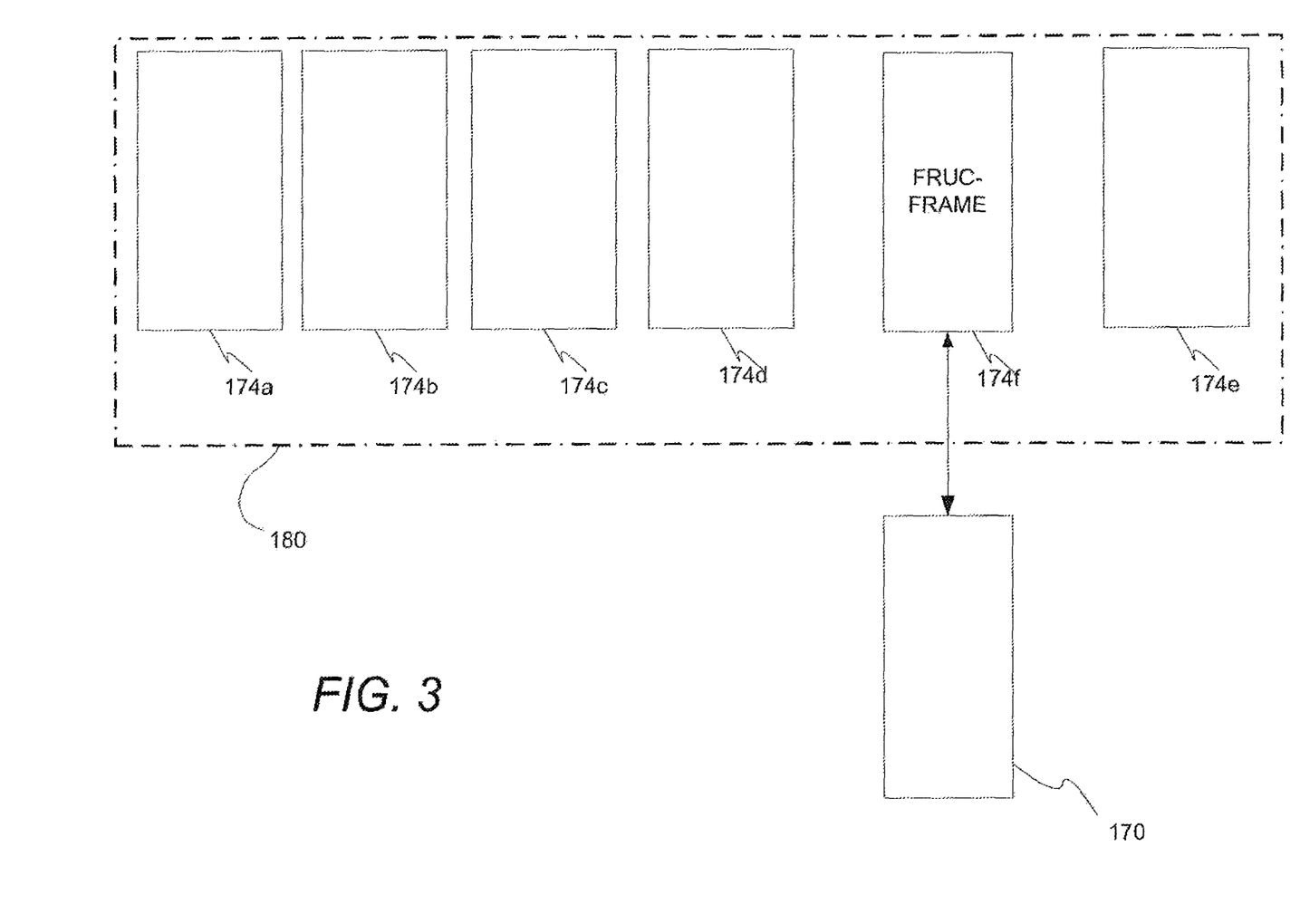
FIG. 3 graphically illustrates portions of a method of encoding a portion of a video frame using a forward up conversion frame in a system such as illustrated in FIG. 1.

FIG. 3 graphically illustrates portions of a method of encoding a portion of the video frame 170 in the system 100 using an interpolated frame. As noted above, Frame Rate Up Conversion (FRUC) is the process of video interpolation at the video decoder 150 to increase the frame rate of the reconstructed video. Such frames can be used to increase the rate that the decoder 150 generates frames to, for example, improve the perceived quality of a transmitted video signal. As illustrated in FIG. 3, a FRUC frame 174*f* may also be generated by the encoder 110 for use in encoding video frames 170. For example, the FRUC frame 174*f* may be generated to correspond to the same time index as the frame to be encoded. It is to be recognized that FRUC frames may be generated for various types of frames, e.g., B frames or P frames.

As illustrated in FIG. 3, the encoder 110 may add the FRUC frame 174*f* to the list of reference frames for encoding the frame 170. It has been found that in some instances portions of the frame 170 may be predictively encoded more compactly with reference to an interpolated frame at the same time index of the frame 170. A reduction in the size of the encoded data can be achieved because the reference data of the FRUC frame may be a closer match to the frame data to be encoded, and thus, the motion data (e.g., a motion vector or a residual) would be reduced or perhaps eliminated (if an exact or sufficiently close match is located). The decoder 150 can instead interpolate the FRUC frame and use its data in place of the omitted motion compensation data.

In operation, in one aspect, if the number of reference frames to be considered for predictive encoding (e.g., the size of the reference list 180) is N (e.g., 5), encoded blocks may be encoded with reference to a particular reference frame number, 0 . . . N−1, in the encoded data for the encoded block. When a block is encoded with reference to the FRUC frame 174*f*, the reference frame number may be set to N, one higher than would be found in a typical list of reference frames 174. Thus, the same field in the encoded data is used to indicate encoding based on an interpolated reference frame and to indicate encoding based on a non-interpolated reference frame. For example, if the encoder 110 is configured to generate a bitstream compliant with a standard syntax such as a H.264 bitstream syntax, identify the reference frame as 0 to N−1 in a 3 bit field according to an encoding specification such as a configuration of standard H.264, the encoder 110 may identify the use of the additional reference frame by setting the reference frame field value to N, thereby using the same bits in the same standard encoding field as would be used to identify one of the reference frames 0 to N−1. The decoder 150 may thus identify the use of an interpolated FRUC frame when it decodes blocks based on encoded data. Further, as the reference frame number is used in standard encoding formats, the encoder 150 may encode with reference to the FRUC frame without including additional data in its output encoded data.

Further, by adding the FRUC frame to the list 180 of reference frames 174, little additional complexity is added to reference frame searching algorithm (other than the additional searching performed due to the increase in the size of the reference list) in obtaining the reduced encoding size from using FRUC frames as references for encoding. Moreover, it has been found that further encoding size reductions can be obtained by using existing data fields in the encoded data format to identify encoding in terms of FRUC frames. For example, the motion vector (MV) and residual (or coded block pattern (CBP)) indicator fields in the encoded data format, along with the reference to an additional position in the reference frame list (as discussed above) can be used to encode blocks based on the FRUC frame 174*f* without adding data fields to the encoding data for a block or frame. Table 1, below, describes four examples of encoding modes using the MV and CBP fields in encoded data to encode a block in terms of the FRUC frame 174*f* in the reference list 190.

TABLE 1

| Field Values Identifying the Encoding Mode | Encoding Data | Explanation |
| --- | --- | --- |
| MV==0 && CBP==0 | MV == 0 && CBP == 0 | No motion vector or residual in encoding data. Decoder 180 decodes block to match FRUC frame. Encoding data is reduced by size of motion vector and residual data that would have been sent for the block. Note that in standard H.264 bitstream format, this combination of bits set to zero is an invalid state. Thus, it can be used to indicate this new efficient FRUC frame encoding mode. |
| MV != 0 && CBP ==0 | The N$^{th}$ reference frame is associated with motion vector, MV, and CBP bit set zero indicates that the block may be decoded using FRUC frame data subject to motion vector offset. | Encoded data is reduced because residual data is not included. Here, use of the Nth reference frame identifies the FRUC frame encoding mode. |
| MV ==0 && CBP !=0 | The N$^{th}$ reference frame is associated with the motion vector, MV, and MV bit set to zero indicates that only a residual with reference to the FRUC frame block is used to decode the corresponding block. | Encoded data is reduced because motion vector data is not included. Here, use of the Nth reference frame identifies the FRUC frame encoding mode. |

TABLE 1-continued

| Field Values Identifying the Encoding Mode | Encoding Data | Explanation |
| --- | --- | --- |
| MV!= 0 && CBP !=0 | The $N^{th}$ reference frame is associated with the motion vector, MV, and indicates that the corresponding block is decoded with reference to the FRUC frame block. | Encoded data is reduced due to more compact motion vector or residual data. Here, use of the Nth reference frame identifies the FRUC frame encoding mode. |

Figure 4:
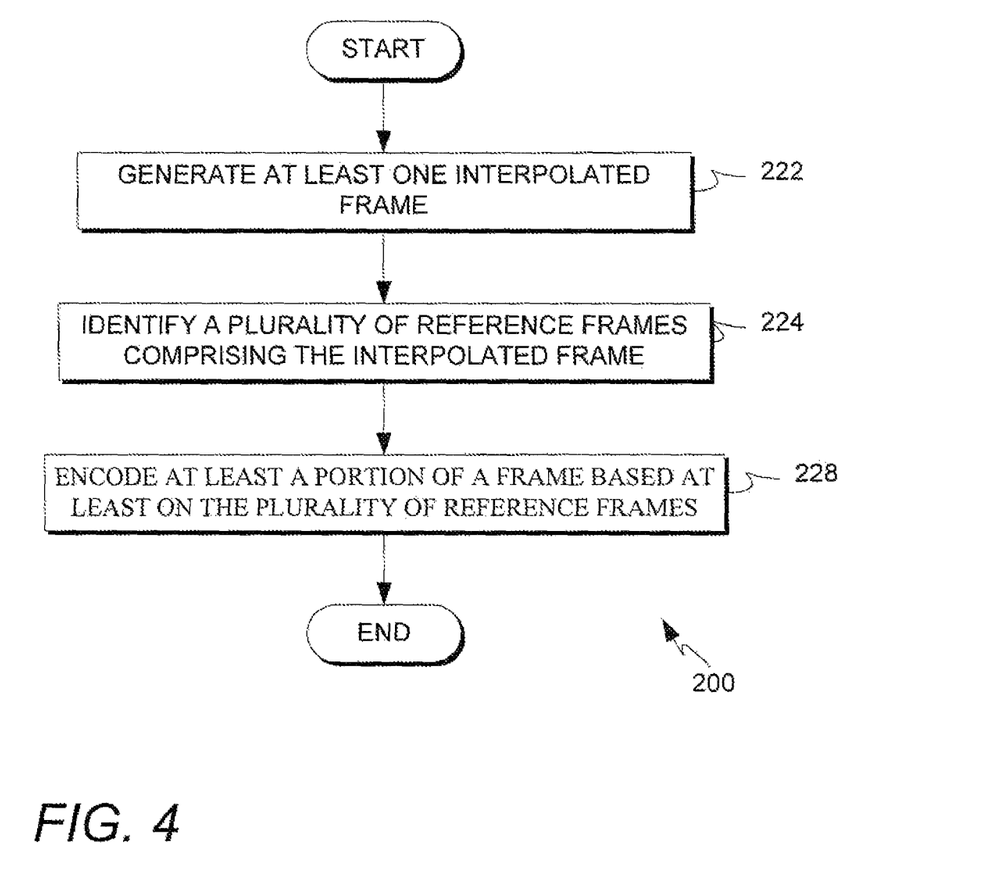
FIG. 4 is a flowchart illustrating one example of a method of encoding a portion of a video stream in a system such as illustrated in FIG. 1.

FIG. 4 is a flowchart illustrating one example of a method 200 of encoding a portion of a video stream in the system 100. The method 200 begins at a flowchart item 222, in which the encoder 110 generates at least one interpolated frame, e.g., the frame 174f. The interpolated frame may include a FRUC frame. Next at a flowchart item 224, the encoder 110 identifies a plurality, e.g., the list 180 of reference frames 174 that includes the interpolated frame, e.g., the frame 174f. In one aspect, a contemporaneous FRUC frame is interpolated for each predicted frame to be encoded. In one aspect, a contemporaneous FRUC frame 174f is generated and inserted into the list 180 for each B frame that is encoded. In one aspect, frames are generated according to a fixed group of pictures (GOP) pattern (the pattern of frames defined between each I frame) such as a "IBPBPBP" pattern. To encode B frames in such a GOP implementation, an FRUC frame is interpolated from P frames neighboring the B frame and added to the list 180 of reference frames. In another aspect, the encoder 110 may generate frames according to an adaptive GOP encoding that adjusts based on the video content. In one example of an adaptive GOP scheme, multiple B frames may be encoded between each P frame. For example, three B-frames may be encoded between the two P-frames. For each B-frame, an independent FRUC frame may be generated at the same time instance as the particular B-frame. In one aspect, the FRUC frame corresponding to each B frame is inserted in the reference frame list 180 for each B frame. Note that to generate the independent FRUC frame for each B frame, data from each the adjacent P frames is scaled accordingly.

Moving to a flowchart item 228, the encoder 110 encodes at least a portion of a frame based at least on the plurality of reference frames 174. It is to be recognized that portions or blocks of any particular frame 170 may or may not be encoded with reference to the interpolated frame 174f, depending on the content of the particular to-be-encode frame 170 and the particular reference frames 174. As described above, the encoder 110 evaluates the cost function of encoding based on the interpolated frame as compared to the remaining frames in the reference list, and selects the reference frame accordingly. The method 200 may be repeated for each portion or block 171 of the frame 170 and may be repeated for each predictively encoded frame in the video signal.

Figure 5:
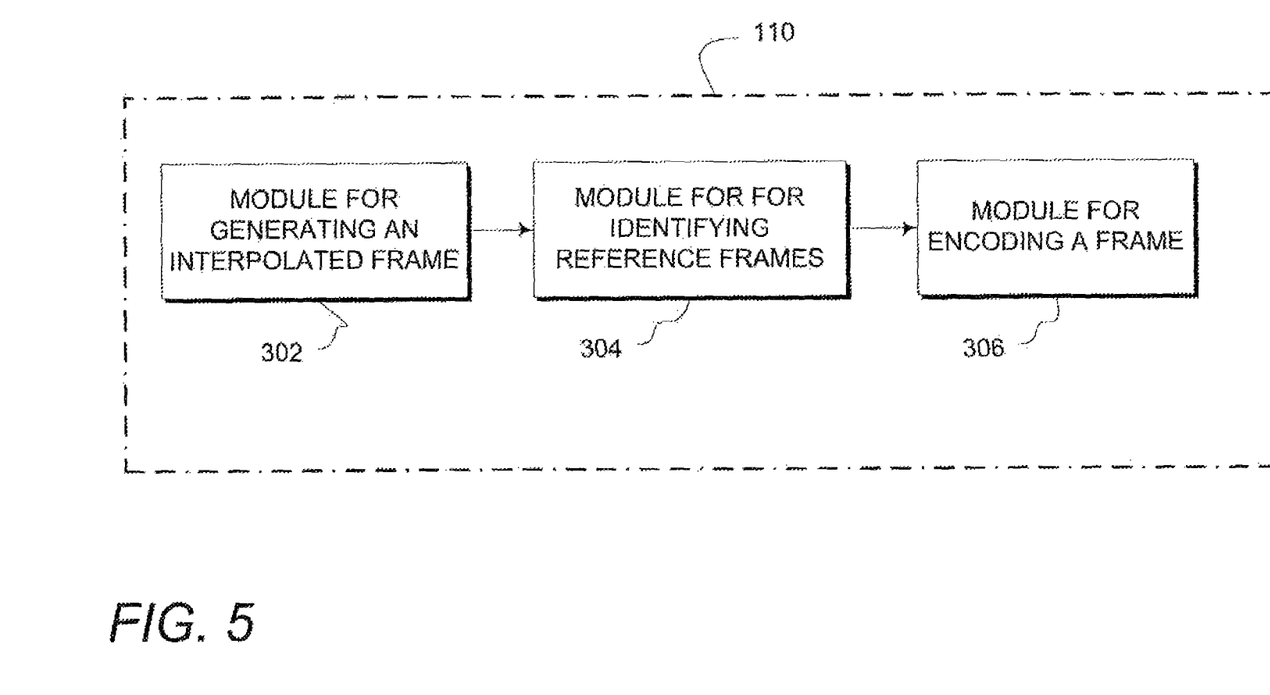
FIG. 5 is a block diagram illustrating an example of an apparatus for processing video data in accordance with the method illustrated in FIG. 4.

FIG. 5 is a block diagram illustrating an example of the encoder 110 for processing video data in accordance with the method 200. The encoder 110 includes modules or blocks such as a module 302 for generating an interpolated frame, a module 304 for identifying reference frames, and a module 306 for encoding a frame. The module 302 for generating an interpolated frame is configured to generate at least one interpolated frame, e.g., the frame 174f, according to the flowchart item 222 of FIG. 4. The module 304 for identifying reference frames is configured to identify a plurality of reference frames 174, e.g., the list 180, that includes the interpolated frame, e.g., the frame 174f, for encoding the frame 170 according to the flowchart item 224 of FIG. 4. The module 306 for encoding a frame is configured to encode at least a portion of the frame 170 based at least on the list 180 of reference frames 174.

Figure 6:
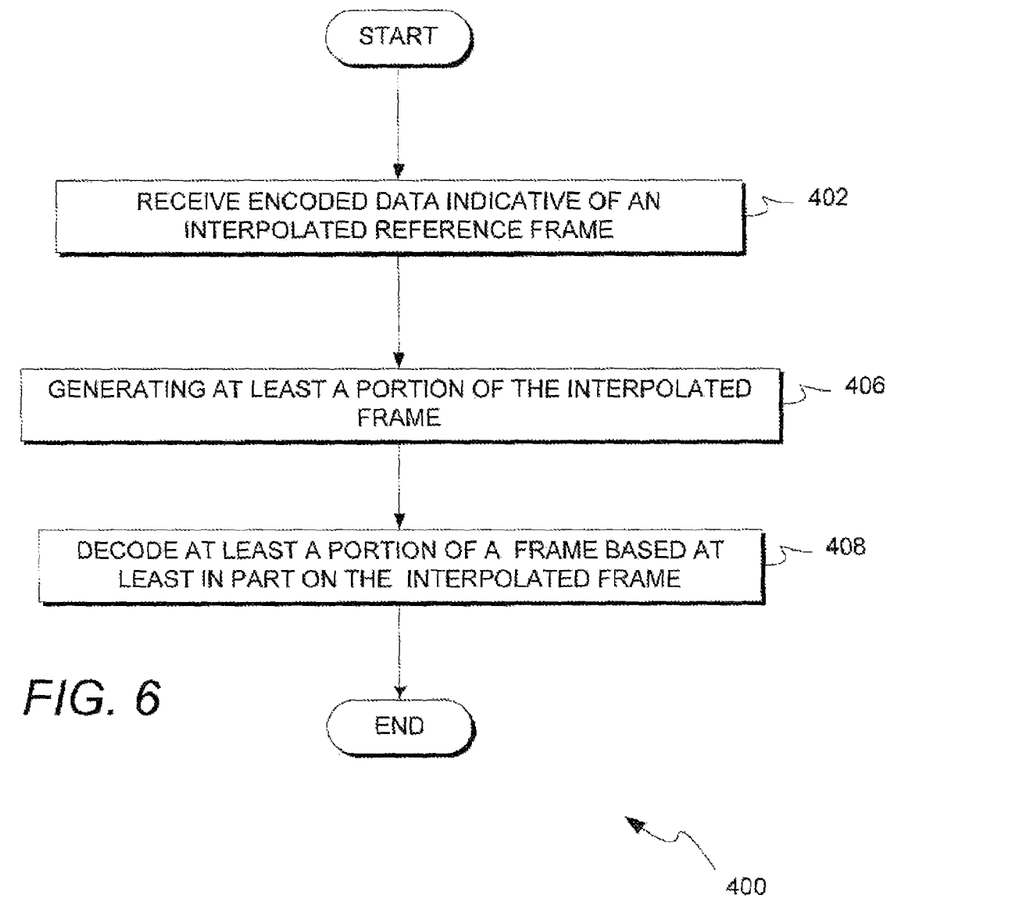
FIG. 6 is a flowchart illustrating in more detail an example of a method of decoding video data such as encoded by the method illustrated in FIG. 4.

FIG. 6 is a flowchart illustrating in more detail an example of a method 400 of decoding video data such as encoded by the method 200. The method begins at a flowchart item 402 in which the decoder 150 receives encoded data indicative of an interpolated reference frame. In one aspect, the encoded data comprises a standard encoded data format in which interpolated frame references are encoded as discussed above with reference to Table 1. In one aspect, the decoder 150 identifies the reference frame as being an interpolated based on the reference frame index being set to N, where non-interpolated reference frames are numbered 0 to N−1. Proceeding to a flowchart item 406, the decoder 150 generates at least a portion of the interpolated frame. In one aspect, the interpolated frame is a FRUC frame. The generation of the interpolated FRUC frame may be simplified because the frame is not displayed (other FRUC frames may still be generated for frame rate upconversion, such FRUC frames may be generated without this simplified processing to preserve picture quality). For example, motion vector merging and scaling may be omitted. Motion vector smoothing may also be simplified, e.g., to a simplified version of 3×3 median smoothing. Moving to a flowchart item 408, the decoder 150 decodes at least a portion of a predicted frame based at least in part on the interpolated frame. The decoder 150 may repeat the acts of method 400 for each block or frame in a video signal. In addition, the decoder 150 may decode other blocks or frames without reference to interpolated frames.

Figure 7:
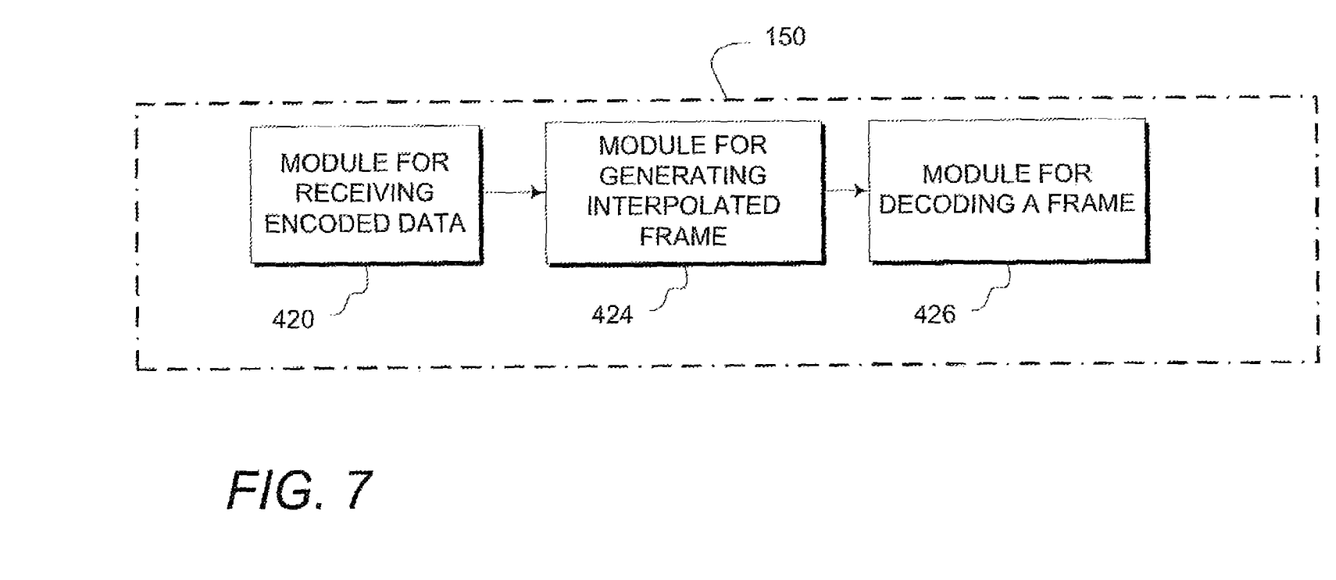
FIG. 7 is a block diagram illustrating an example of an apparatus for processing video data in accordance with the method illustrated in FIG. 7.

FIG. 7 is a block diagram illustrating an example of the decoder 150 in accordance with the method 400. The decoder 150 includes modules or blocks such as a module 420 for receiving encoded data, a module 424 for generating an interpolated frame, and a module 426 for decoding a predicted frame. The module 420 for receiving encoded data is configured to receive encoded data indicative of a reference frame for at least a portion of a predicted frame, e.g., as described with reference to the flowchart item 402 of FIG. 6. The module 424 for generating an interpolated frame is configured to generate at least a portion of the interpolated frame. In one aspect, the interpolated frame is a FRUC frame, e.g., as described with reference to the flowchart item 406 of FIG. 6. The module 426 for decoding a predicted frame is configured to decode at least a portion of a predicted frame based at least in part on the interpolated frame, e.g., as described with reference to the flowchart item 408 of FIG. 6.

In view of the above, one will appreciate that the invention overcomes the problem of encoding multimedia data such as video data. For example, an encoded video signal with a reduced bandwidth can be generated. Alternatively, the same bandwidth can be used for other purposes such as increased video quality.

Those of skill will recognize that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the principles and novel features disclosed herein.

While the above detailed description has shown, described, and pointed out novel features of the invention as applied to various aspects, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of processing multimedia data, the method comprising:
    generating at least one interpolated frame by an encoder;
    identifying a plurality of reference frames comprising said interpolated frame and a plurality of non-interpolated frames by the encoder, wherein the plurality of reference frames comprises at least one list of reference frames, wherein the interpolated frame is at a specified position in the at least one list, and wherein the specified position identifies the frame in the specified position as an interpolated frame; and
    encoding at least a portion of a frame based at least on the plurality of reference frames by the encoder, wherein a same field in the encoded at least a portion of a frame is used to indicate encoding using one of the plurality of non-interpolated reference frames by indicating a position in the at least one list of reference frames other than the specified position, and to indicate encoding using the interpolated frame by indicating the specified position in the at least one list of reference frames, wherein encoding comprises generating encoding data indicative of an encoding mode and a residual pattern, wherein said encoding data is further indicative of whether the portion is encoded based on the interpolated frame.

2. The method of claim 1, wherein said specified position is at an end of the at least one list of the reference frames.

3. The method of claim 1, wherein encoding further comprises predicting the portion based at least in part on said interpolated frame.

4. The method of claim 3, wherein predicting comprises generating the residual pattern based on said interpolated frame.

5. The method of claim 1, wherein encoding further comprises generating encoding data in accordance with a standard compliant bit stream syntax.

6. The method of claim 5, wherein the standard compliant bitstream syntax comprises an H.264 compliant bitstream syntax.

7. The method of claim 1, wherein encoding further comprises generating encoding data having a field that is indicative of either an interpolated or non-interpolated reference frame.

8. The method of claim 1, wherein generating comprises generating the interpolated frame based on at least one predictive frame.

9. The method of claim 1, wherein generating comprises generating an upconversion frame.

10. The method of claim 1, wherein generating comprises generating the interpolated frame at substantially the time associated with the encoding of the portion of the frame.

11. An apparatus for processing multimedia data, comprising:
    a generator configured to generate at least one interpolated frame;
    an identifier configured to identify a plurality of reference frames comprising said interpolated frame and a plurality of non-interpolated frames, wherein the plurality of reference frames comprises at least one list of reference frames, wherein the interpolated frame is at a specified position in the at least one list, and wherein the specified position identifies the frame in the specified position as an interpolated frame; and an encoder configured to encode at least a portion of a frame based at least on the plurality of reference frames, wherein a same field in the encoded at least a portion of a frame is used to indicate encoding using one of the plurality of non-interpolated reference frames by indicating a position in the at least one list of reference frames other than the specified position, and to indicate encoding using the interpolated frame by indicating the specified position in the at least one list of reference frames, wherein said encoder is configured to generate encoding data indicative of an encoding mode and a residual pattern, wherein said encoding data is further indicative of whether the portion is encoded based on the interpolated frame.

12. The apparatus of claim 11, wherein said specified position is at an end of the at least one list of the reference frames.

13. The apparatus of claim 11, wherein said encoder is configured to predict the portion based at least in part on said interpolated frame.

14. The apparatus of claim 13, wherein said encoder is configured to generate the residual pattern based on said interpolated frame.

15. The apparatus of claim 11, wherein said encoder is configured to further generate encoding data in accordance with a standard compliant bit stream syntax.

16. The apparatus of claim 15, wherein the standard compliant bitstream syntax comprises a H.264 compliant bitstream syntax.

17. The apparatus of claim 11, wherein said encoder is configured to further generate encoding data having a field that is indicative of either an interpolated or non-interpolated reference frame.

18. The apparatus of claim 11, wherein said generator is configured to generate the interpolated frame based on at least one predictive frame.

19. The apparatus of claim 11, wherein said generator is configured to generate an upconversion frame.

20. The apparatus of claim 11, wherein said generator is configured to generate the interpolated frame at substantially the time associated with the encoding of the portion of the frame.

21. An apparatus for processing multimedia data, comprising:
means for generating at least one interpolated frame;
means for identifying a plurality of reference frames comprising said interpolated frame and a plurality of non-interpolated frames, wherein the plurality of reference frames comprises at least one list of reference frames, wherein the interpolated frame is at a specified position in the at least one list, and wherein the specified position identifies the frame in the specified position as an interpolated frame; and
means for encoding at least a portion of a frame based at least on the plurality of reference frames, wherein a same field in the encoded at least a portion of a frame is used to indicate encoding using one of the plurality of non-interpolated reference frames by indicating a position in the at least one list of reference frames other than the specified position, and to indicate encoding using the interpolated frame by indicating the specified position in the at least one list of reference frames, wherein said means for encoding is configured to generate encoding data indicative of an encoding mode and a residual pattern, wherein said encoding data is further indicative of whether the portion is encoded based on the interpolated frame.

22. The apparatus of claim 21, wherein said specified position is at an end of the at least one list of the reference frames.

23. The apparatus of claim 21, wherein said means for encoding is configured to predict the portion based at least in part on said interpolated frame.

24. The apparatus of claim 23, wherein said means for encoding is configured to generate the residual pattern based on said interpolated frame.

25. The apparatus of claim 21, wherein said means for encoding is configured to further generate encoding data in accordance with a standard compliant bit stream syntax.

26. The apparatus of claim 25, wherein the standard compliant bitstream syntax comprises a H.264 compliant bitstream syntax.

27. The apparatus of claim 21, wherein said means for encoding is configured to further generate encoding data having a field that is indicative of either an interpolated or non-interpolated reference frame.

28. The apparatus of claim 21, wherein said means for generating is configured to generate the interpolated frame based on at least one predictive frame.

29. The apparatus of claim 21, wherein said means for generating is configured to generate an upconversion frame.

30. The apparatus of claim 21, wherein said means for generating is configured to generate the interpolated frame at substantially the time associated with the encoding of the portion of the frame.

31. A multimedia data processor comprising a configuration to:
generate at least one interpolated frame;
identify a plurality of reference frames comprising said interpolated frame and a plurality of non-interpolated frames, wherein the plurality of reference frames comprises at least one list of reference frames, wherein the interpolated frame is at a specified position in the at least one list, and wherein the specified position identifies the frame in the specified position as an interpolated frame; and
encode at least a portion of a frame based at least on the plurality of reference frames, wherein a same field in the encoded at least a portion of a frame is used to indicate encoding using one of the plurality of non-interpolated reference frames by indicating a position in the at least one list of reference frames other than the specified position, and to indicate encoding using the interpolated frame by indicating the specified position in the at least one list of reference frames, wherein encoding comprises generating encoding data indicative of an encoding mode and a residual pattern, wherein said encoding data is further indicative of whether the portion is encoded based on the interpolated frame.

32. A non-transitory machine readable medium comprising instructions for processing multimedia data, wherein the instructions upon execution cause a machine to:
generate at least one interpolated frame;
identify a plurality of reference frames comprising said interpolated frame and a plurality of non-interpolated frames, wherein the plurality of reference frames comprises at least one list of reference frames, wherein the interpolated frame is at a specified position in the at least one list, and wherein the specified position identifies the frame in the specified position as an interpolated frame; and
encode at least a portion of a frame based at least on the plurality of reference frames, wherein a same field in the encoded at least a portion of a frame is used to indicate encoding using one of the plurality of non-interpolated reference frames by indicating a position in the at least one list of reference frames other than the specified position, and to indicate encoding using the interpolated frame by indicating the specified position in the at least one list of reference frames, wherein encoding comprises generating encoding data indicative of an encoding mode and a residual pattern, wherein said encoding data is further indicative of whether the portion is encoded based on the interpolated frame.

33. A method of processing multimedia data, the method comprising:
   receiving encoded data indicative of an interpolated reference frame for at least a portion of a frame by a decoder, wherein the encoded data indicative of the interpolated frame identifies a specified position in a reference frame index that is indicative of the interpolated reference frame and a same field in the encoded data is used to indicate encoding based on the interpolated reference frame by identifying the specified position in the reference frame index, and encoding based on a non-interpolated reference frame by identifying a position in the reference frame index other than the specified position, wherein the encoded data is further indicative of an encoding mode and a residual pattern, and is further indicative of encoding based on the interpolated frame;
   generating at least a portion of said interpolated reference frame by the decoder; and
   decoding at least a portion of the frame based at least in part on the generated portion of the interpolated reference frame by the decoder.

34. The method of claim 33, wherein generating comprises generating at least a portion of a frame rate upconversion frame.

35. The method of claim 33, wherein generating comprises generating based on at least one predictive frame.

36. An apparatus for processing multimedia data, comprising:
   a receiver configured to receive encoded data indicative of an interpolated reference frame for at least a portion of a frame, wherein the encoded data indicative of the interpolated frame identifies a specified position in a reference frame index that is indicative of the interpolated reference frame and a same field in the encoded data is used to indicate encoding based on the interpolated reference frame by identifying the specified position in the reference frame index, and encoding based on a non-interpolated reference frame by identifying a position in the reference frame index other than the specified position, wherein the encoded data is further indicative of an encoding mode and a residual pattern, and is further indicative of encoding based on the interpolated frame;
   a generator configured to generate at least a portion of said interpolated reference frame; and
   a decoder configured to decode at least a portion of the frame based at least in part on the generated portion of the interpolated reference frame.

37. The apparatus of claim 36, wherein said generator is configured to generate at least a portion of a frame rate upconversion frame.

38. The apparatus of claim 36, wherein said generator is configured to generate said interpolated frame based on at least one predictive frame.

39. An apparatus for processing multimedia data, comprising:
   means for receiving encoded data indicative of an interpolated reference frame for at least a portion of a frame, wherein the encoded data indicative of the interpolated frame identifies a specified position in a reference frame index that is indicative of the interpolated reference frame and a same field in the encoded data is used to indicate encoding based on the interpolated reference frame by identifying the specified position in the reference frame index, and encoding based on a non-interpolated reference frame by identifying a position in the reference frame index other than the specified position, wherein the encoded data is further indicative of an encoding mode and a residual pattern, and is further indicative of encoding based on the interpolated frame;
   means for generating at least a portion of said interpolated reference frame; and
   means for decoding at least a portion of the frame based at least in part on the generated portion of the interpolated reference frame.

40. The apparatus of claim 36, wherein said means for generating is configured to generate at least a portion of a frame rate upconversion frame.

41. The apparatus of claim 36, wherein said means for generating is configured to generate said interpolated frame based on at least one predictive frame.

42. A multimedia data processor comprising a configuration to:
   receive encoded data indicative of an interpolated reference frame for at least a portion of a frame, wherein the encoded data indicative of the interpolated frame identifies a specified position in a reference frame index that is indicative of the interpolated reference frame and a same field in the encoded data is used to indicate encoding based on the interpolated reference frame by identifying the specified position in the reference frame index, and encoding based on a non-interpolated reference frame by identifying a position in the reference frame index other than the specified position, wherein the encoded data is further indicative of an encoding mode and a residual pattern, and is further indicative of encoding based on the interpolated frame;
   generate at least a portion of said interpolated reference frame; and
   decode at least a portion of the frame based at least in part on the generated portion of the interpolated reference frame.

43. A non-transitory machine readable medium comprising instructions for processing multimedia data, wherein the instructions upon execution cause a machine to:
   receive encoded data indicative of an interpolated reference frame for at least a portion of a frame, wherein the encoded data indicative of the interpolated frame identifies a specified position in a reference frame index that is indicative of the interpolated reference frame and a same field in the encoded data is used to indicate encoding based on the interpolated reference frame by identifying the specified position in the reference frame index, and encoding based on a non-interpolated reference frame by identifying a position in the reference frame index other than the specified position, wherein the encoded data is further indicative of an encoding mode and a residual pattern, and is further indicative of encoding based on the interpolated frame;
   generate at least a portion of said interpolated reference frame; and
   decode at least a portion of the frame based at least in part on the generated portion of the interpolated reference frame.

* * * * *